US007274832B2

(12) United States Patent
Nicponski

(10) Patent No.: US 7,274,832 B2
(45) Date of Patent: Sep. 25, 2007

(54) IN-PLANE ROTATION INVARIANT OBJECT DETECTION IN DIGITIZED IMAGES

(75) Inventor: Henry Nicponski, Albion, NY (US)

(73) Assignee: Eastman Kodak Company, Rochester, NY (US)

( * ) Notice: Subject to any disclaimer, the term of this patent is extended or adjusted under 35 U.S.C. 154(b) by 873 days.

(21) Appl. No.: 10/712,077

(22) Filed: Nov. 13, 2003

(65) Prior Publication Data

US 2005/0105805 A1 May 19, 2005

(51) Int. Cl.
*G06K 9/32* (2006.01)
(52) U.S. Cl. .................................. 382/297; 382/289
(58) Field of Classification Search ............... 382/289, 382/297
See application file for complete search history.

(56) References Cited

OTHER PUBLICATIONS

"Face Detection Using the 1st -Order RCE Classifier", Proc. IEEE Int'l Conf. Image Processing, Jeon, B., Lee, S., and Lee, K., 2002.*
"Face Detection Using the 1st -Order RCE Classifier", *Proc. IEEE Int'l Conf. Image Processing*, Jeon, B., Lee, S., and Lee, K., 2002.
"Rotation Invariant Neural Network-Based Face Detection", *Proc. IEEE Conf. Computer Vision and Pattern Recognition*, Rowley, H., Baluja, S., and Kanade, T., 1998, pp. 38-44.
"Robust Real-Time Object Recognition", *Proc. Second International Workshop on Statistical and Computational Theories of Vision—Modeling, Learning, Computing, and Sampling*, Viola, P. and Jones, M., 2001.
Feraud, Raphael, et al., "A Fast and Accurate Face Detector Based On Neural Networks", *IEEE Trans. Pattern Analysis and Machine Intelligence*, 23(1), pp. 42-53.
Schneiderman, H., and Kanade, T., "Probabilities Modeling of Local Appearance and Spatial Relationships for Object Recognition", *Proc. CVPR 1998*, pp. 45-51.
Pudil, P., Novovicova, J, and Kitller, J., "Floating search methods in feature selection", *Pattern Recognition Letters 15*, pp. 1119-1125.

* cited by examiner

*Primary Examiner*—Matthew C. Bella
*Assistant Examiner*—G. F. Cunningham
(74) *Attorney, Agent, or Firm*—Robert Luke Walker

(57) ABSTRACT

In methods, systems, and computer program products for locating a regularly configured object within a digital image, a plurality of primary rotated integral images of the digital image are computed. Each primary rotated integral image has a different in-plane rotation. A set of secondary rotated integral images are derived from each of the primary rotated integral images. The secondary rotated integral images have further in-plane rotations relative to the respective primary rotated integral image. A window is defined within the digital image and corresponding windows of the rotated integral images. The values of convolution sums of a predetermined set of feature boxes within the window, in each of the rotated integral images are extracted. The dimensionality of the convolution sums is reduced to provide a set of reduced sums. A probability model is applied to the reduced sums to provide a best estimated derotated image of the window.

19 Claims, 9 Drawing Sheets

IN-PLANE ROTATION INVARIANT OBJECT DETECTION IN DIGITIZED IMAGES

FIELD OF THE INVENTION

The invention relates generally to the field of digital image processing, and in particular to a method and apparatus for finding objects in an image, where the method applies regardless of the in-plane rotational orientation of objects in the image.

BACKGROUND OF THE INVENTION

Much recent research in the computer vision field concerns the abilities to find "regularly configured objects" (also referred to hereafter by the shorter term "objects") in digital images. Objects can be defined as classes of real-world entities that obey consistent rules with respect to geometric shape and appearance. Examples of objects includes human faces, whole people, cars, animals, and buildings.

The ability to computationally find objects in images varies directly with the extrinsic and intrinsic consistency of the class appearance. "Extrinsic consistency" refers to factors, such as lighting and pose, that can vary dramatically and are independent of the physical properties of the objects. "Intrinsic consistency" refers to factors due to the physical properties of the objects. Clearly, some types of objects present more variation in their appearance than others. For example, the class of human faces obeys fairly tight geometric constraints on overall physical shape and the relative placement of component parts, such as eyes, nose, and mouth. The class of whole people, on the other hand, exhibits far more variation in appearance due to the articulated nature of the limbs and the bending abilities of the human body.

Past applications of object detection have tended to focus on tightly-defined object classes with limited appearance variability, such as the set of human faces. Successful object detectors, including face detectors, have been constructed and commercially deployed. One common weakness of such detectors is a capability to deal with only a limited range of object poses or viewpoints.

There can be many sources of variation in the appearance of human faces in images: personal identity, pose, illumination, deformation, and imaging process parameters, to name the most important. Surprisingly, of the sources mentioned, changing specific individual identity may contribute a smaller amount to the change in appearance of an imaged face than do the other factors. This statement is true when using almost any non-cognitive measure of appearance similarity. This may seem surprising and even counter-intuitive in light of the great facility of the human observer's identification of individual persons. Such facility might seem to imply that there are substantial invariant aspects of the appearance of individual persons over disparate viewing conditions. But this conclusion is not true. The situation here resembles to some extent the cognitive process of color constancy. There, highly sophisticated physiological and psychological mechanisms of eye, retina, and brain combine to create the perceptual illusion of color constancy that can be easily dispelled with a roll of color film and some variety of illuminants. (The film serves the role of a much more primitive imaging system than that of the human observer.) Similarly here, in the domain of facial appearance, there is widespread physiological evidence that exceedingly sophisticated visual and mental processes, including tailored neuronal support, necessarily underlay the seemingly effortless recognition of human individuals.

The situation is otherwise when considering quantitative (i.e. mathematical) measures of appearance similarity of faces. The effects of illumination and pose can produce much greater changes to the appearance of faces than are caused by identity difference. The difference referenced here is that of a quantitative measure, such as mean square error, Mahalanobis distance, or the like.

In many applications of face detection to commercial tasks, finding the faces serves as an enabling technology to subsequent processing steps. Depending on the speed requirements of that processing, it may be true that insufficient speed in the face detection portion of the processing would render the overall tasks unsuccessful. For this reason, many recent approaches have concentrated on producing algorithms that operate in the most rapid possible manner. These approaches tend to have the disadvantage of a large false positive rate, particularly when out-of-plane rotation is present. A further problem of many of the above approaches is dependence upon correction orthogonal orientation of images prior to object location. An example of such is face location limited to a nominal upright image orientation and small ranges of rotation away from the nominal orientation. Possible ameliorative measures, such as multiple passes, additional training, and use of multiple classifiers add complexity and require additional time.

To handle in-plane rotation without multiple applications of a classifier trained for upright frontal faces, and hence with the attendant performance penalties, some researchers have prefaced their classifiers with a module that can determine the in-plane rotational orientation of a face candidate in a window. These approaches have been referred to as "invariance-based methods", since the face detector examines image data rotated to make the purported face appear in nominal upright position.

In "Face Detection using the 1st-order RCE Classifier", *Proc. IEEE Int'l Conf. Image Processing*, Jeon, B., Lee, S., and Lee, K., 2002; an orientation module acts on test windows before examination by the main classifier. The module estimates the most likely orientation of a face, should a face happen to be present, returning a meaningless indication otherwise. The orientation module first binarizes a test window using an adaptive threshold, and then searches for best-fit rotational orientation of the purported eye lines (judging the eyes to be the most reliable facial feature) in one degree increments. The subsequent classifier, based on first-order reduced Coulomb energy, examines the test window explicitly rotated based on the estimation of the orientation module.

Similarly, in "Rotation Invariant Neural Network-Based Face Detection", *Proc. IEEE Conf. Computer Vision and Pattern Recognition*, Rowley, H., Baluja, S., and Kanade, T., 1998, 38-44 a neural-network based rotation-estimation module is provided prior to the main classifier, which also happens to be implemented with a receptive-field neural network architecture.

The approaches of these publications have the shortcoming of a risk that the time cost of the rotation estimation would approach that of the face classification decision, leading to a substantial speed loss in the overall detection system. An additional shortcoming is that these approaches are not extended to situations, in which both in-plane and out-of-plane rotation are substantial.

Use of integral images in fast computational methods is disclosed in "Robust Real-Time Object Recognition", *Proc. Second International Workshop on Statistical and Compu-*

*tational Theories of Vision—Modeling Learning, Computing, and Sampling*, Viola, P. and Jones, M., 2001.

Dimensionality reduction has been widely applied to machine learning applications, as well as many other data processing tasks such as noise reduction, data modeling, and data transformation as a solution to some types of overtraining.

Solutions to the problem of estimation of probability distribution in data are well known and can be divided broadly into three categories—parametric, non-parametric, and a mid-ground semi-parametric category.

Many different kinds of face detectors are known in the computer vision literature. Common methods involve neural-network based detectors Rowley, H., Baluja, S., and Kanade, T., "Rotation Invariant Neural Network-Based Face Detection", *Proc. IEEE Conf. Computer Vision and Pattern Recognition* 1998, 38-44, domain-division cascaded classifier Viola, Paul, and Jones, Michael, "Robust Real-Time Object Recognition", *Proc. Second International Workshop on Statistical and Computational Theories of Vision—Modeling, Learning, Computing, and Sampling*, 2001, and heterogeneous cascaded classifiers Feraud, Raphael, et al., "A Fast and Accurate Face Detector Based on Neural Networks", *IEEE Trans. Pattern Analysis and Machine Intelligence*, 23(1), 42-53. Another example of an object detector that can be used as a face detector is provided in Schneiderman, H., and Kanade, T., "Probabilistic Modeling of Local Appearance and Spatial Relationships for Object Recognition", *Proc. CVPR* 1998, 45-51.

It would thus be desirable to provide improved methods, computer systems, and computer program products, in which the most likely in-plane orientation of objects can be rapidly estimated and in which substantial out-of-plane rotation is tolerated.

SUMMARY OF THE INVENTION

The invention is defined by the claims. The invention, in broader aspects, provides methods, systems, and computer program products for locating a regularly configured object within a digital image. In the method, a plurality of primary rotated integral images of the digital image are computed. Each primary rotated integral image has a different in-plane rotation. A set of secondary rotated integral images are derived from each of the primary rotated integral images. The secondary rotated integral images have further in-plane rotations relative to the respective primary rotated integral image. A window is defined within the digital image and corresponding windows of the rotated integral images. The values of convolution sums of a predetermined set of feature boxes within the window, in each of the rotated integral images are extracted. The dimensionality of the convolution sums is reduced to provide a set of reduced sums. A probability model is applied to the reduced sums to provide a best estimated derotated image of the window.

It is an advantageous effect of the invention that improved methods, computer systems, and computer program products are provided, in which the most likely in-plane orientation of objects can be rapidly estimated and in which substantial out-of-plane rotation is tolerated.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1A:
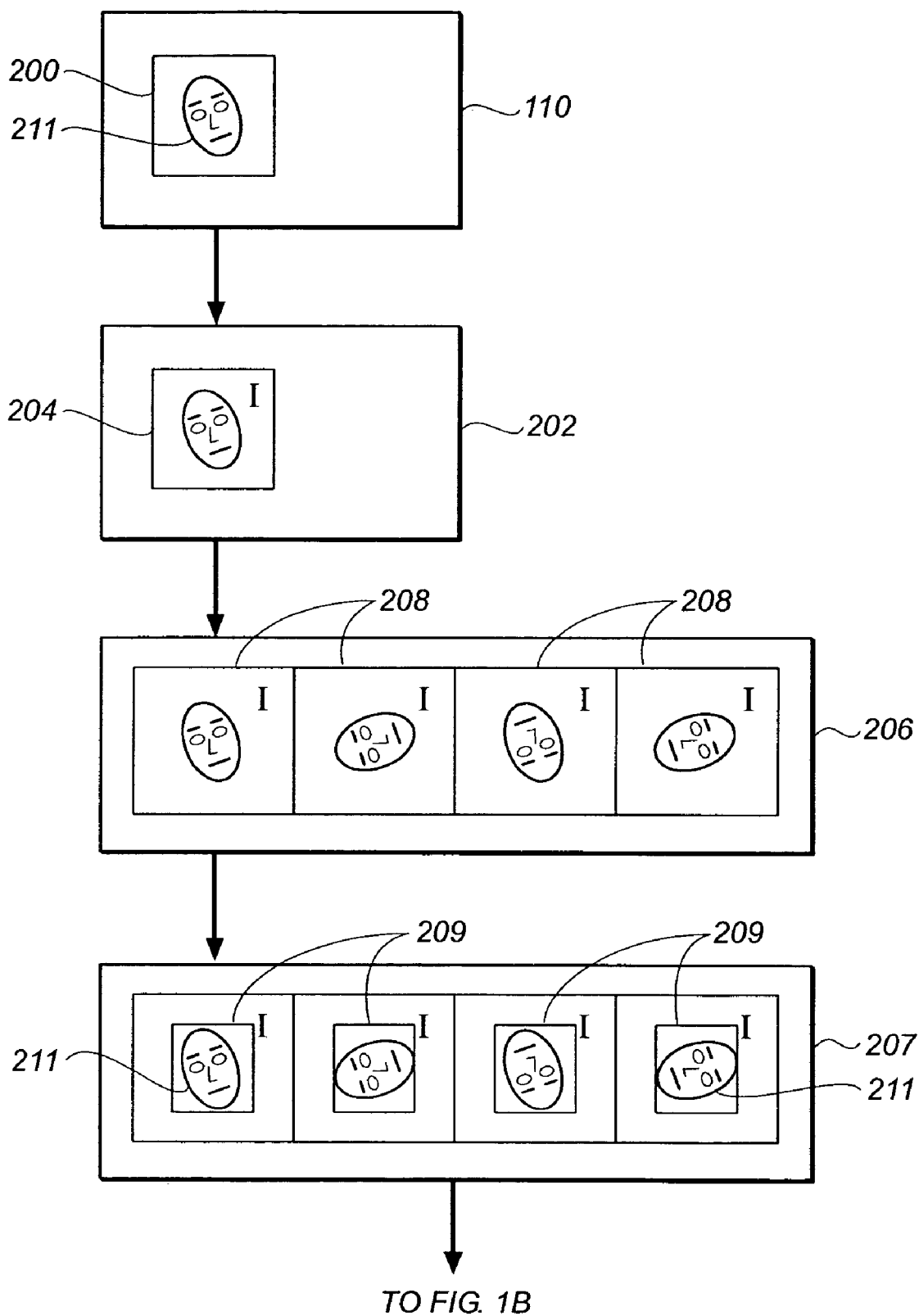
FIG. 1 is a diagrammatical view of an embodiment of the method of the invention. The letter I indicates an integral image.

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner (not shown). Images may also be input directly from the digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112. In accordance with the invention, the algorithm disclosed in the preferred embodiment of the invention may be stored in any of the storage devices heretofore mentioned and applied to images for object detection and location of specific objects.

The object detection algorithm disclosed in the preferred embodiment of the present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cellphone that can be used as a processing unit, a display unit, or a unit to give processing instructions), and as a service offered via the World Wide Web.

In each case, the algorithm may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The performance of an object detection system is constrained by multiple and often counter-balancing dimensions of true and false detection rates, speed, and algorithm size. Two pre-dominant engineering considerations come into play. First, the system detection statistics, both true and false, should not be impacted too adversely by the introduction of rotation tolerance. Second, system speed decline should not be too large.

With respect to the effect of rotation tolerance to detection performance, a concern arises that introduced errors might counterbalance benefits of improved detection. For example, this is an issue with frontal face detection algorithms, since those algorithms exhibit good detection performance and extreme poses with rotated faces are relatively rare.

The second practical consideration concerning algorithm choice relates to the speed impact of in-plane rotation tolerance. For many applications of face detection, algorithm speed carries great weight. If the rotation intolerance comes at the cost of examination of several rotated versions of the image, then system speed will decrease by a factor equal to the number of orientations to be examined. (It is possible that some shared computation might reduce the speed penalty slightly.) If a rotation pre-estimator is applied, then the computational cost of the estimator is added to the computational cost of the subsequent face detector, and could easily halve the overall system speed. It is most important, then, that speed loss be kept to a minimum while still obtaining the desired performance invariance.

The methods, systems, and computer program products of the invention have an algorithm that provides an accurate and very fast rotation pre-estimator. In disclosed embodiments, the pre-estimator locates rotated human faces based upon learning the patterns of rectangular integrals in the face region of a set of upright facial images. The invention is generally described herein in relation to embodiments that detect human faces, but is not limited and can detect other classes of objects that exhibit geometrically consistent three dimensional shapes and predictable patterns of predominantly lighter and darker regions or symmetries.

Figure 3:
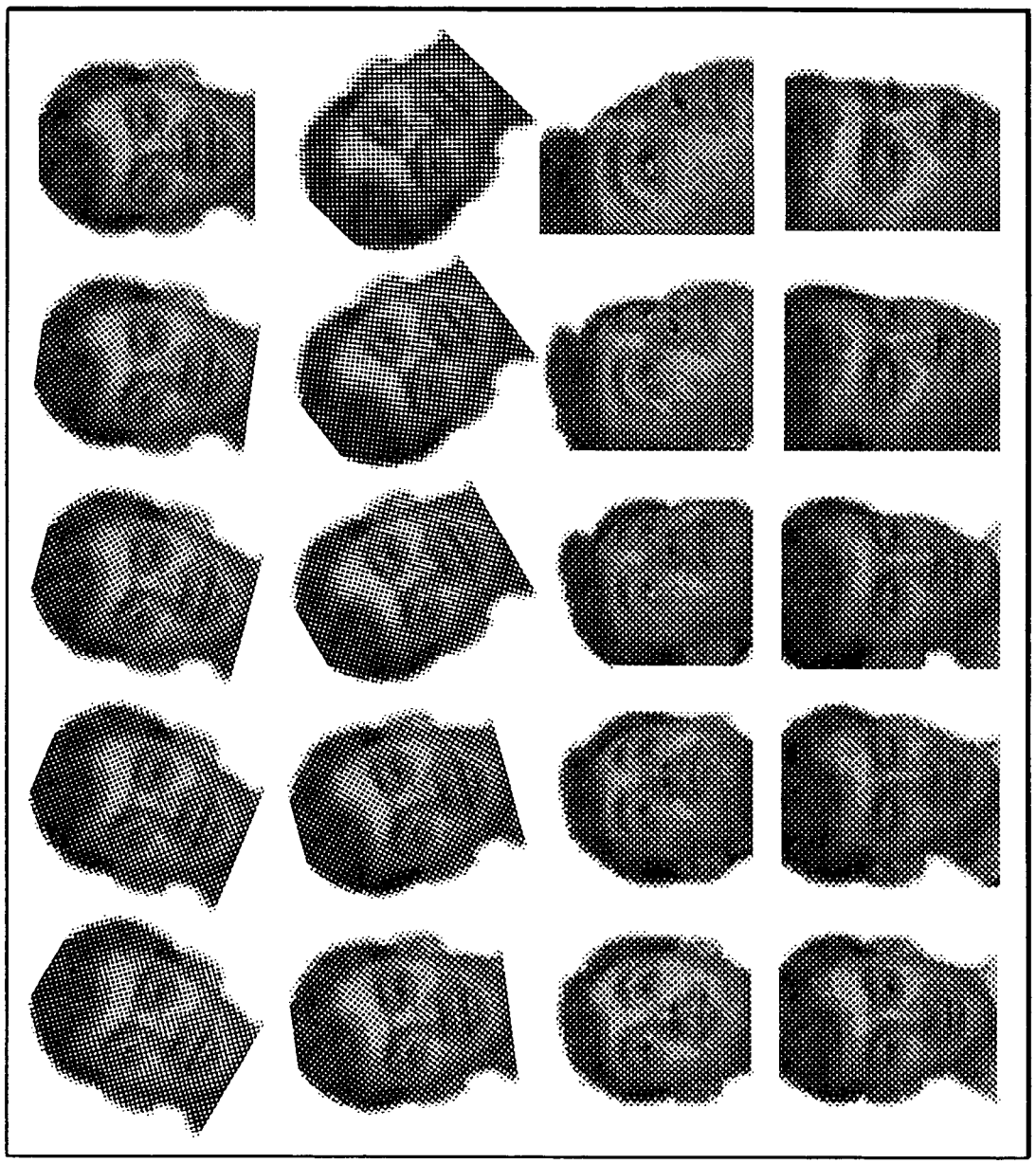
FIG. 3 is a diagrammatical view of a series of facial images illustrating head pose. Top two rows show in-plane rotation. Bottom two rows show out-of-plane (in-depth) rotation.

Different types of head rotations are referred to here by the terms "in-plane rotation" and "out-of-plane rotation". This first two rows of images in FIG. 3 illustrate in-plane rotation. The in-plane rotation of the head leads to in-plane rotation of the face appearance in the image. The "plane" in view here can be visualized as the imaging focal plane or the projection of the focal plane back into 3D space. Rotations in-plane result in identical but rotated patterns in a digitized image, that is, the imaging operation can be commuted with the rotation. On the other hand, out-of-plane rotations, also termed rotations in depth, result in entirely different patterns in the image. The second two rows of FIG. 3 show out-of-plane rotations.

Figure 1B:
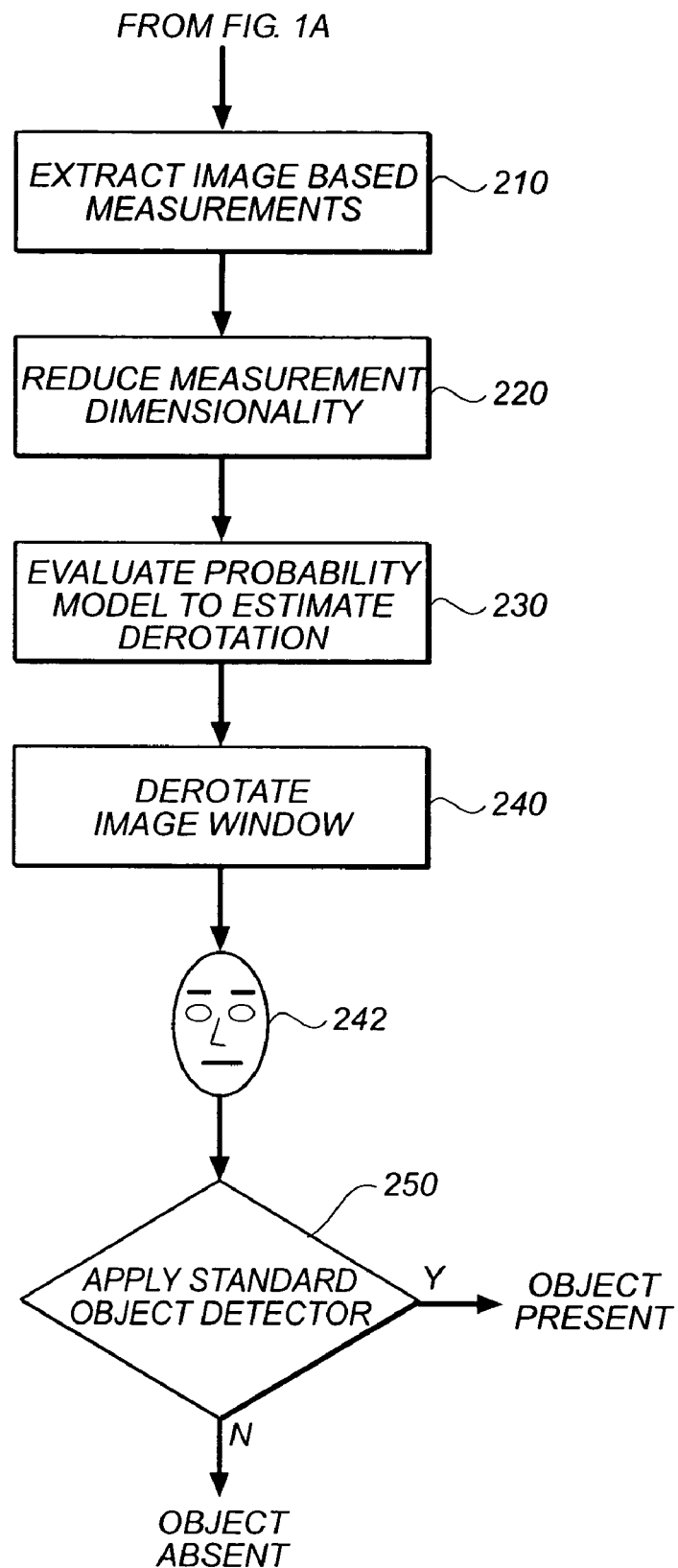
Figure 2:
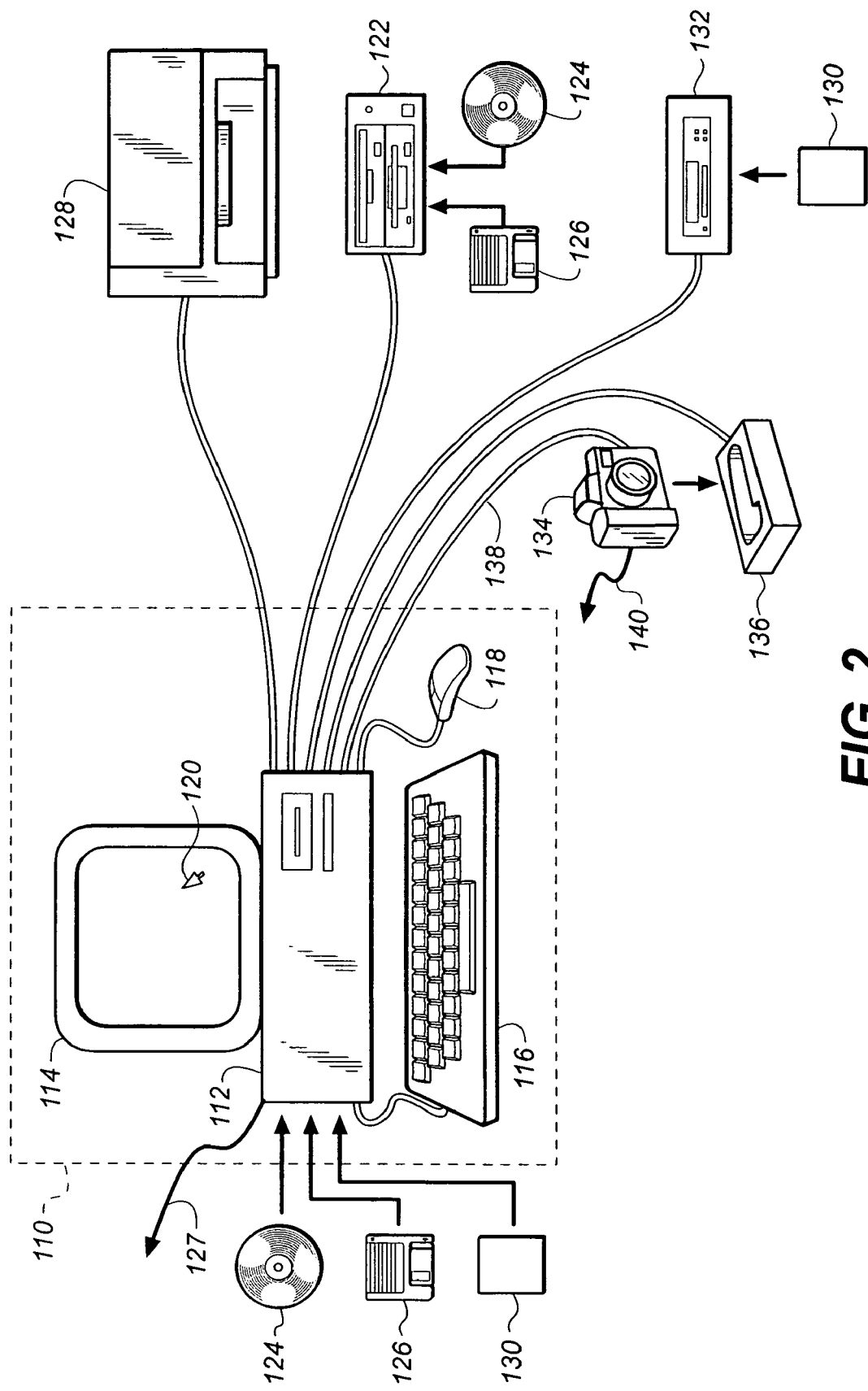
FIG. 2 is a perspective diagram of a computer system for implementing the present invention.

Referring now to FIGS. 1A-2, the system 110 has a computational unit 112, which receives a digital image 200 from an image source, such as a digital camera 134, removable memory, or a local or remote communication network. Within the computational unit, the pre-estimation algorithm is applied. A rotation estimation procedure will necessarily operate as a preliminary step in a global image face detection search. The search process can use a scheme of searching across locations and scales in an image to find faces of different sizes and locations. Alternatively, in a simple case, the search process can zero in on a single position and scale.

An integral image module 202 computes one or more primary rotated integral images 204 of the digital image. (FIG. 1A illustrates only a single primary rotated integral image.) Each primary rotated integral image has a different rotation relative to an initial position defined by the in-plane rotational position of the digital image.

An derivation module 206 derives a set of secondary rotated integral images 208 from each of the primary rotated integral images 204. The set has secondary rotated integral images 208 having further in-plane rotations of 90 degrees, 180 degrees, and 270 degrees relative to the respective primary rotated integral image 204. For example, a primary rotated integral image having a rotation of 10 degrees relative to the digital image has corresponding secondary rotated integral images at 100 degrees, 190 degrees, and 280 degrees.

A window module 207 defines one or more windows 209 within the primary and secondary rotated integral images. A window 209 is a rectangular array of image pixels. Each window has the same orientation in each of the rotated integral images, in other words, the windows do not rotate with the integral images. In the illustrated embodiment, a human face 211 is represented within a particular image window. The face has an in-plane rotation away from the upright position in the original digital image. The search for windows can be exhaustive at all locations and scales. "All scales" refers to windows having a minimum size large enough to accommodate a predefined set of facial characteristics or like characteristics of another class of regularly configured objects.

An image measurement module 210 then extracts one or more sets of representative image measurements from each of the windows and summarizes those measurements as one or more numerical data vectors. The multiple data vectors correspond to multiple possible rotational orientations of a human face, should a face be present in the image window. The measurements extracted are convolution sums of feature boxes within each of the windows, in each of the rotated integral images.

Figure 5:
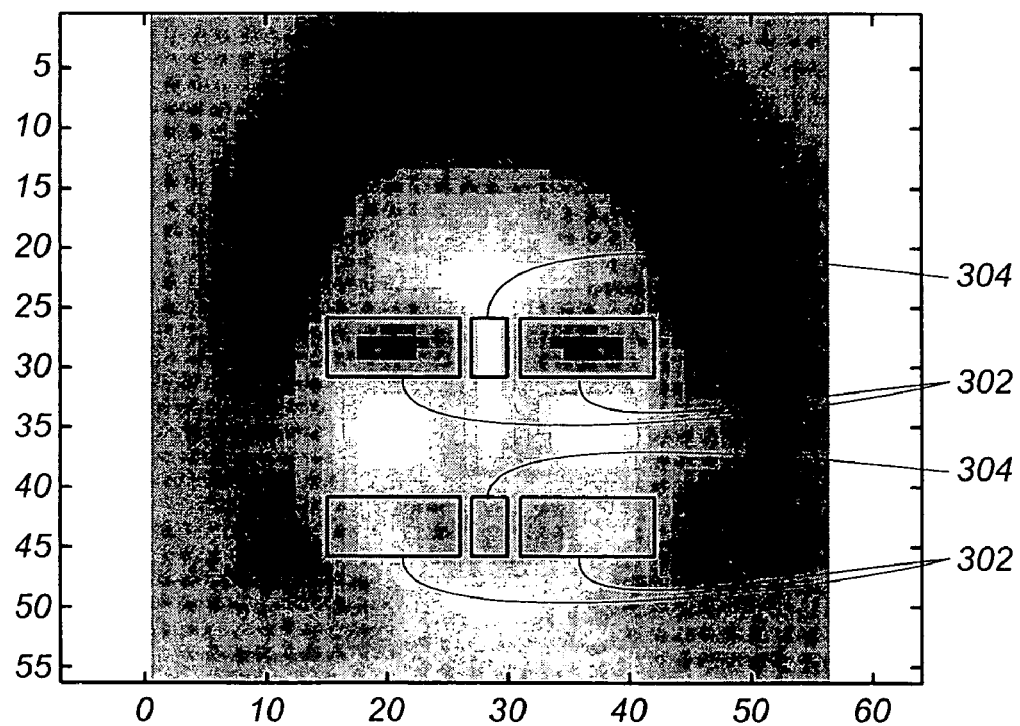
FIG. 5 is the same view as FIG. 4 showing feature boxes of a particular embodiment. The masked central region is not indicated.

In an embodiment shown in FIG. 5, the feature boxes are arranged in first and second horizontal rows. Each row has two outer feature boxes 302. Each outer feature box is longer horizontally than vertically. Each row has a single inner feature box 304 disposed between respective outer feature boxes 302. The feature boxes do not touch 302,304, but could do so. The feature boxes 302,304, when aligned with a nominally sized and oriented human face, overlap the eyes and bridge of the nose with the first row of feature boxes and overlap the mouth and part of the cheeks with the second row of feature boxes.

Next, a dimensionality reduction module 220 performs a mathematical transformation on the numerical data vectors, resulting in transformed numerical data vectors that are more stable in the data space used to estimate face rotational position. Reduction of the dimensionality of the convolution sums provides a corresponding set of reduced sums.

A probability module 230 evaluates a probability density model, using the transformed numerical data vectors, to determine a probability that a face is present at each of the respective potential face orientations. Using the probabilities, a de-rotation module 240 digitally rotates the extracted image window by an amount to exactly compensate for the most probable face orientation, producing a derotated image. It is expected that a face, if present in the window, will now have the upright orientation. The application of the probability model and derotation algorithm to each of the sets of reduced sums provides a best estimated derotated image of each of the windows. A simple peak-finding algorithm operates on the likelihood data for each test window. Many such algorithms will be known to those skilled in data analysis. The simplest possible algorithm, and the preferred implementation in this invention, is to simply search for the maximum likelihood among the computed likelihoods. However, it will be recognized that more robust schemes might involve low-pass filtering of the data prior to peak searching, to deal with the high noise levels that are apparent in the likelihood computations.

An object detection module 250 receives the derotated image 242 (symbolized as a face), is trained to detect human faces and can next examine the derotated images to perform a yes/no classification decision, indicating either the presence of the absence of a face in the original image window.

The above steps are repeated on multiple image windows in an image search strategy, thereby performing an exhaustive search of the entire image to find as many faces as are present in the image. The ability to find the human faces in an image stream offers numerous possibilities for enhanced imaging services, including services based upon higher-level semantic understanding and processing of the images. Examples of services are: ensuring the correct reproduction of the skin colors of facial regions and provision of optional imaging services related to the thematic category of an image or group of images (such as baby or wedding pictures).

Referring now to a particular embodiment, in the pre-estimation procedure, primary rotated integral images are computed for 90 degrees of rotation and secondary rotated integral images are derived so as to provide rotated integral images at k rotational orientations, spaced at 0°, 360/k°, 2*360/k°, ..., 350°. In this case, k=36, which provides a 10° spacing was used. Other spacing can be provided in the same manner. It was presumed that during a subsequent image search by the face detection algorithm, a test window centered at (r,c) with scale s, would be examined to determine whether a human face was present. Using the k/4 rotated integral images, the probability model was applied k/4 times by extracting the face region projections and sums at the proper location, taking into account the scale, from each of the rotated integral images. The measured image data (convolution sums) then underwent dimensionality reduction and were plugged (separately) into the probability models (equations (7) and (10)) to obtain the likelihood of the data given face at the respective rotational orientations.

Figure 7:
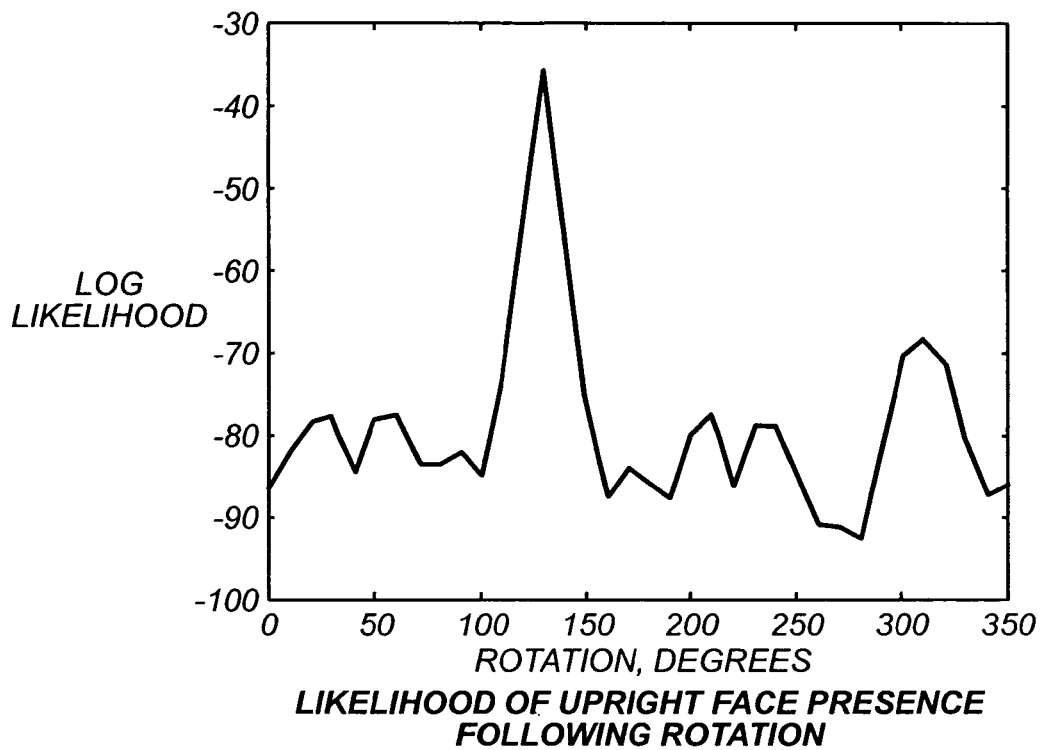
FIG. 7 is a diagram of rotation vs. log of likelihood and shows a typical pattern of likelihood at different orientations for a face whose true orientation was 230°.
Figure 8:
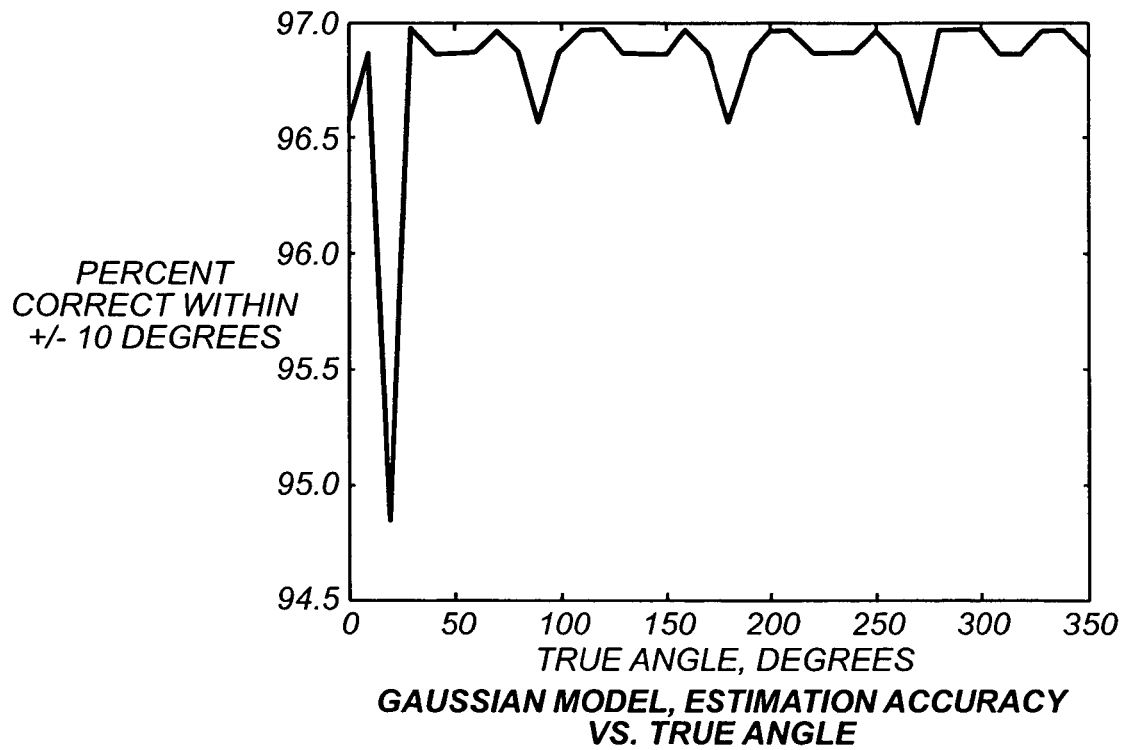
FIG. 8 is a diagram of the computed likelihood of upright face presence from the Gaussian model, by subsequent de-rotation angle.
Figure 9:
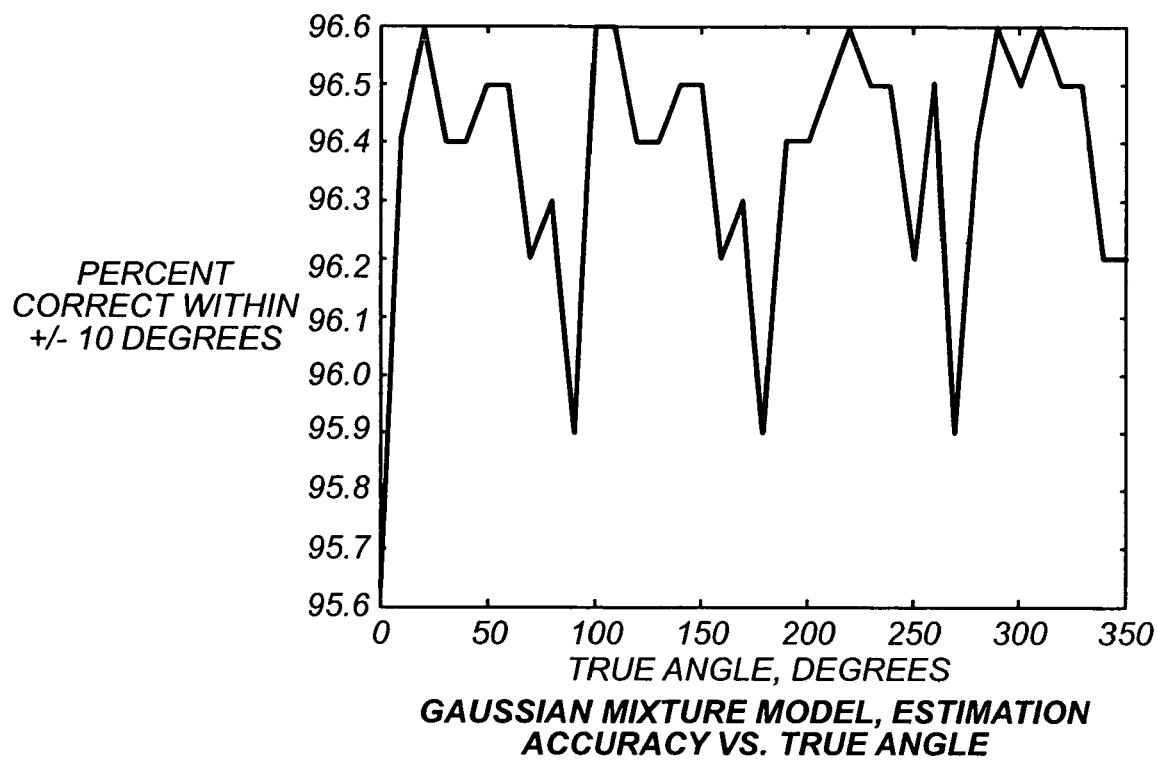
FIG. 9 is a diagram of the computed likelihood of upright face presence from the Gaussian mixture model, by subsequenct de-rotation angle.

The derived secondary rotated integral images, in effect, provide repeats of the procedures for each initial angle between 0 degrees and 90 degrees with the additional orthogonal rotations (relative to the initial angle) of 90°, 180°, and 270°. The same integral images are used, advantage being taken of the periodicity properties of integral image, with access modified using the translations presented in Table 1. In this way, k likelihood values for face presence are estimated, and the rotational angle is judged to be that which gave rise to the highest likelihood (that is, the maximum a posteriori principle). FIG. 7 shows a typical pattern of likelihood at different orientations for a face whose true orientation was 230°. The likelihood peaks around 130°, which is the amount of rotation needed to make the face appear upright. In fact, the face orientation can be estimated as 360° minus the orientation of maximum likelihood response. The response profile also shows a secondary peak 180° away from the primary maximum. This common occurrence led to the introduction of the additional six face regions, shown in FIG. 5, whose sums are also measured and included in the data vector acted upon by the rotation model.

The digital image is initially provided as an intensity image. The integral image $\Im$ of intensity image $I(i,j)$ is defined in the discrete domain with the equation:

$$\Im_{(discrete)}(i,j) = \sum_{r=1}^{i}\sum_{c=1}^{j} I(r,c) \quad (1)$$

Thus, the intensity image value at pixel (i,j) is the summation of all image pixels above and to the left of (i,j), inclusive (note the use of origin-unity image coordinates). The integral image can be computed in a single pass over the image I using the recurrence relations:

$$S(i,j)=S(i,j-1)+I(i,j)$$

$$\Im(i,j)=\Im(i-1,j)+S(i,j) \quad (2)$$

with boundary values fixed all at zero.

Using the integral image, the value of the convolution sum over any rectangular region of the intensity image can be computed with four memory accesses and three additions. This fixed operation count does not depend on the size or location of the rectangle. Suppose it is desired to compute the sum of a rectangle having upper left pixel $(r_0,c_0)$ and lower right pixel $(r_1,c_1)$. The computation is $$\sum_{rect} I = \Im(r_1,c_1) + \Im(r_0-1, c_0-1) - \Im(r_0-1, c_0) - \Im(r_0, c_0-1) \quad (3)$$

Figure 12:
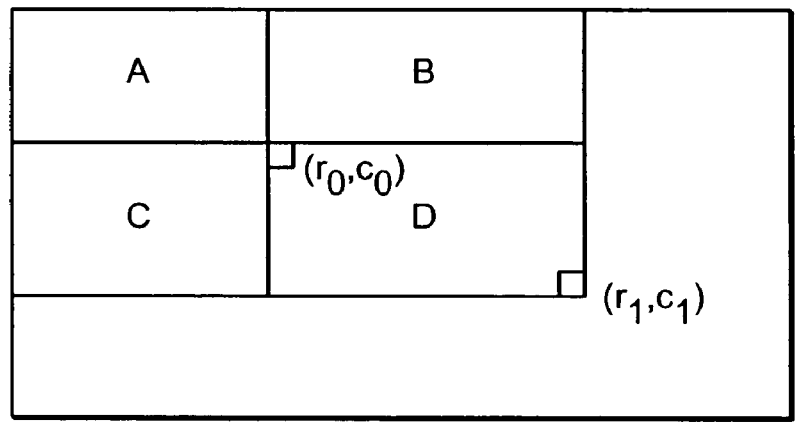
FIG. 12 is a diagram of the procedure of using an integral image to compute rectangular convolution sums.

Referring to FIG. 12, the computation can be visualized geometrically as the summation and subtraction of four rectangular areas of the intensity image. To compute the integral of rectangle D of the intensity image, using integral image values perform (A+B+C+D)+(A)−(A+B)−(A+C), totaling four accesses to the integral image.

Image operators such as convolution, differentiation, and integration can be freely commuted. If images f and g have finite support, considering $f^n$ to be the n-th integral of f (or the n-th derivative if n is negative), then the order of integration (or differentiation) and convolution can be freely exchanged:

$$(f*g)^n = f^n*g = f*g^n \quad (4)$$

Alternatively, integration, differentiation, and convolution can all be combined and freely commuted, as in $$f*g = (\int\int f)*g'' \quad (5)$$

Application in discrete form of equation (5) follows directly when f represents the intensity image I and g is the spatial rectangle of interest. The two summations of I take place along the row and column dimensions, as do likewise the two discrete differences of the rectangle g. The computational advantages of the right hand side of equation (5) over the left hand side occur because the integral image of I can be computed just once, and the second differences of the rectangle g consist of exactly four delta functions in the rectangle corners. Thus, the many summations of the discrete convolution of equation (5) (left hand side) are replaced by four accesses to ΣΣI.

The integral image computations exhibit a kind of pseudo-periodicity with respect to 90° rotations that permits computations to be reduced to $$\frac{k}{4}$$

integral images. In the context of the rotation pre-estimator, each rotated integral image is symmetrical to orthogonal (0°, 90°, 180°, 270°) rotations. Given a rotated integral image at an initial angle of rotation relative to the digital image, the rotated integral images of three other orthogonal orientations (also referred to herein as "symmetrical angles") can be derived from it. This fact can be seen from three observations. (1) The values of an integral image are exactly sums over rectangles, where nominally the rectangles have one corner fixed at the upper left pixel. (2) Arbitrary rectangle sums can be calculated using at most four accesses to an integral image. (3) Rectangles remain rectangles upon orthogonal rotation (albeit in a different pixel position).

Table 1 presents translations required to derive three secondary rotated integral images at symmetrical angles from a primary rotated integral image at an initial angle. The transformations in Table 1 allow one to compute primary rotated integral images limited to a 90 degree range of orientations and then derive the secondary rotated integral images, thereby cutting the computational cost of the in-plane rotation estimation by essentially a factor of four. In the table, a rectangle anchored at ($r_0$,$c_0$) of size w×h, rotated about center of rotation $c_{row}$, $c_{col}$, is transformed with new parameters expressed in the coordinate system of the un-rotated integral image.

TABLE 1

Access translations needed to effect orthogonal rotations to primary rotated integral images.

| Rotation | Upper left row | Upper left column | Width | Height |
|---|---|---|---|---|
| 0 | $r_0$ | $c_0$ | w | h |
| 90 | $c_{row} + c_{col} - c_0 - w + 1$ | $c_{col} - c_{row} + r_0$ | h | w |
| 180 | $2 * c_{row} - r_0 - h + 1$ | $2 * c_{col} - c_0 - w + 1$ | w | h |
| 270 | $c_{col} - c_{row} + c_0$ | $c_{row} + c_{col} - r_0 - h + 1$ | h | w |

Figure 4:
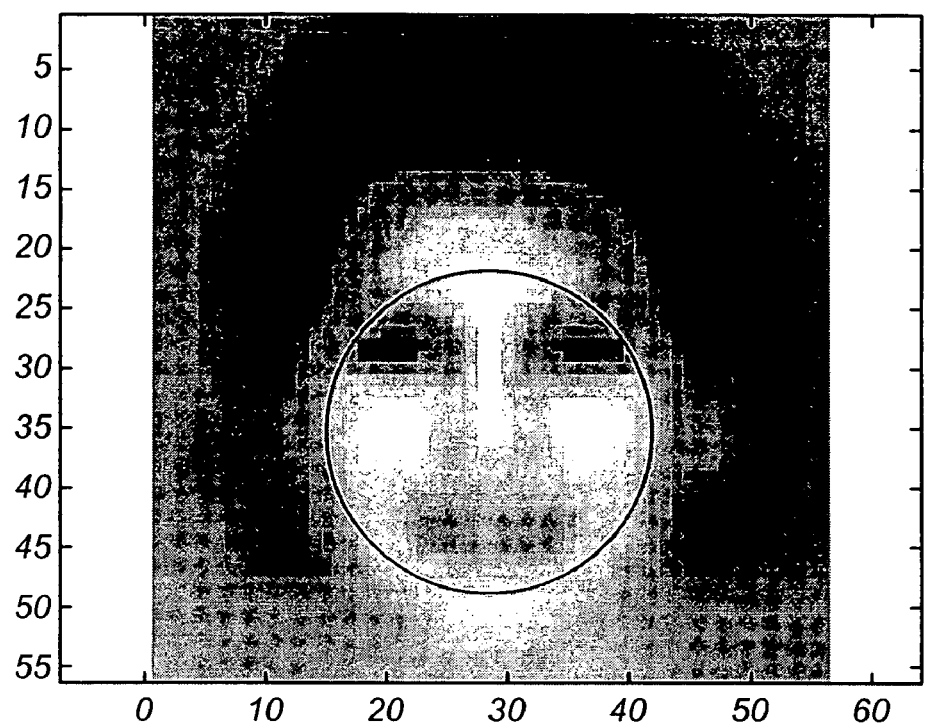
FIG. 4 is a diagrammatical view of the "average face" and its masked central region.

In order to build a rotation estimator using rectangular convolution sums, it is necessary to select the specific rectangles, called "features", to be used when examining the test window. In every case spatially normalized windows are considered. A reference nominal window is defined, of dimensions 56×56 pixels. If a face is present in the window, its reference nominal position is as shown in the FIG. 4, with the eyes centered at row, col (28, 20) and (28, 35), respectively.

Faces in digitized images can be of various sizes, and it is desired to find them regardless of their size. One common method of providing size invariance is to perform a multi-scale search of the image, examining windows of all sizes. It is only necessary to proportionally adjust the sizes of the nominal features based on the ratio of the size of the test window to the size of the reference window. Since the integral image provides rectangular convolution sums of all rectangles, regardless of size, using constant operation count, it can be seen that the size of the test window has no effect on the feature measurement process with the exception that the convolution sums must be normalized to account for the variable number of pixels in the test window compared to the nominal window.

There are many methods of feature selection known in the computer vision literature, broadly divisible into automated and manual means of selection. In automated means of selection, such as in Viola, Paul, and Jones, Michael, "Robust Real-Time Object Recognition", *Proc. Second International Workshop on Statistical and Computational Theories of Vision—Modeling, Learning, Computing, and Sampling* 2001. and Pudil, P., Novovicova, J, and Kitller, J., "Floating search methods in feature selection", *Pattern Recognition Letters* 15, 1119-1125, a pool of available features is assembled, and features are selected one at a time, according to some selection criteria, until the desired number of features, or the desired classifier performance, is attained. In the context of this invention, the pool of features consists of all possible rectangular convolution sums, with the rectangles being of all sizes and positions, in the nominal 56×56 pixel test window. There are many tens of thousands of such rectangle features.

In Viola, Paul, and Jones, Michael, "Robust Real-Time Object Recognition", *Proc. Second International Workshop on Statistical and Computational Theories of Vision—Modeling, Learning, Computing, and Sampling*, 2001, the authors teach a sequential forward search (SFS) feature selection method consisting of a greedy search algorithm. An overall merit function is defined, typically consisting of the classification error on a set of training image examples. At each step, the available feature is selected that most reduces the merit function. This algorithm suffers from the propensity to move towards local minima in the merit function, as do all greedy optimization algorithms. For this reason, Pudil, P., Novovicova, J, and Kitller, J., "Floating search methods in feature selection", *Pattern Recognition Letters* 15, 1119-1125 invented to concept of sequential forward floating search (SFFS), in which backtracking steps can be taken by discarding previous chosen features if the merit function can be further reduced. In this way, the algorithm can move out of local minima with the hope of finding a better overall feature set.

An alternative to automated feature selection algorithms is the process of manual feature selection. In manual selection, the opportunity is presented for a human expert to choose features based on problem domain knowledge or any other factors that might be pertinent. Thus, the elusive quality of "human intelligence" comes into play. Specifically, automated methods can only choose feature sets based on the specifics of the example training sets used as the basis for the optimization. In many computer vision applications, the assemblage of suitable and representative training sets can be the most difficult portion of the undertaking. For this reason, it can be true that manual feature selection will lead to a more parsimonious and powerful feature set, resulting in better generalization performance of the final classifiers.

As part of this invention, either automated or manual feature selection methods can be used to determine the specific rectangular convolution sums used. For face orientation, the preferred method is to select feature sets manually to take advantage of human knowledge of the problem domain.

Figure 6:
FIG. 6 is a diagrammatical view of an in-plane rotated digital image of a human face (first row), a convolution sum of a horizontal line of pixels through the image center (second row), a convolution sum of a vertical line of pixels through the image center (third row), and convolution sum of the feature boxes from FIG. 5 (fourth row).

It can be noted that the arrangement of human facial features leads to very different profiles of aggregation across the vertical and horizontal directions of the facial region. Using FIG. 5 as a reference, consider the sums of the horizontal and vertical lines of pixel intensity values in the circularly masked face region. FIG. 6, shows the same face along with bar graphs of those directed sums. In the top row are shown nine in-plane rotated versions of the central face masked area followed by two rows with bar charts of the horizontal and vertical sums of the intensity pixels, respectively. In each case, the sums have been normalized by the number of pixels in the masked row or column. (The bottom row of bar charts will explained shortly.)

The following observations can be made. First, in the upright face position, there is a clear difference in the horizontal and vertical sums. The vertical sum (third row) exhibits a symmetry that reflects the left-right physical symmetry of the face. The horizontal sum shows a strong minimum in the position of the eyes, and a less pronounced minimum at the mouth position. Second, as the face rotates these clear signatures become mixed together until, at the 45° orientation, they are virtually identical. Third, if the next (90° degree) face orientation were shown in the figure, it would be the same as the upright orientation but with the roles of horizontal and vertical sums exchanged. In fact, there is a pseudo 90° symmetry (horizontal and vertical sums exchanged) and true 180° symmetry in the sums. The method here, in effect, trains a machine learning algorithm to recognize the typical pattern of the sums in the upright face orientation (left column of FIG. 6) and distinguish that pattern from the patterns of the other orientations.

Now, to explain the bottom row of FIG. 6, a set of six addition convolution sums were also computed, representing the sums of six rectangular facial regions as shown in FIG. 5. The rationale behind the selection of these regions is to overcome a predominant failure mode due to training the learning algorithm using just the horizontal and vertical integrals, namely estimation of the face orientation in error by exactly 180° (and, to a lesser extent, 90°). The six regions, covering the eyes and mouth, yield very different typical sums when rotated 90° and 180°.

A linear transformation is used to reduce the dimensionality of the convolution sums. This helps remove the manifold redundancies and noise sources that are present in visual information. This step is especially important in machine learning systems that learn from examples, for at least two reasons. First, it is frequently not possible to provide a large enough set of training examples to fully cover the range of variations possible in the test stimuli. Second, machine learning algorithms frequently have high capacity—that is, high ability to learn the peculiarities of the training data—that will respond and lock into statistical fluctuations of the training data that are not generally true of the object class. These aspects of machine learning tasks presents a risk of over-fitting—biasing learning methods to accidents in the training data, and not to general, consistent characteristics of the object class of interest.

There are two primary methods for dealing with the problem of over-training during machine learning. The first method is to reduce the "capacity" of the learning algorithm Vapnik, V., *The Nature of Statistical Learning Theory*, Springer Verlag, New York, 1995—that is, to reduce its ability to respond to accidents in the training data by restricting the types of data models it can employ. This solution is directly analogous to limiting the degree of polynomial in data-modeling. The second method is to pre-process the data in an attempt to remove the accidents and present only its essential characteristics to the learning algorithm.

Dimensionality reduction is a solution of the second type to over-training. Many methods of dimensionality reduction are known in the literature, usually involving mathematical transformations of measured data. Transformation can range from simple linear transformations (such as principal components analysis (PCA), Fisher analysis, etc.) to arbitrarily complex non-linear transformations (examples include non-linear principal components, auto-associative neural networks, kernel components analysis, etc.). Any of these dimensionality reduction methods can be used as part of this invention. Currently preferred is the well-known linear PCA transformation.

The principal components analysis (PCA) creates a linear transformation of data into a related representational space in which the dimensions are statistically independent and orthogonal. Furthermore, the dimensions are arranged such that the first few encode the bulk of the variations present in the training data. The PCA possesses many desirable mathematical properties Magnus, J., and Neudecker, H., *Matrix Differential Calculus with Applications in Statistics and Econometrics*, John Wiley and Sons, Chichester, 1988. The PCA, being a linear transformation, also has the advantage of fast speed. Inspection of the sum profiles in FIG. 6 immediately reveals the presence of redundancy in the data, as evidenced by the slowly varying nature of the top two rows. A PCA transformation reduces the dimensionality of the data and enables the estimation of more reliable statistical models. In this work, d=20 or d=40 for the dimension of the PCA subspace into which the data were converted, from the original representation of the sums with N=58 dimensions.

The evaluation of the probability model is a maximum a posteriori (MAP) estimation of the most likely face orientation using the modeled distribution. The evaluation constructs an estimate of the statistical distributions of the reduced dimension image data observed when (1) the image window contains a face, and (2) the face is upright in rotational orientation. It will be recognized by a person skilled in the art that many different methods of probability density estimation can be used as part of this invention. Described below are two currently preferred implementations: the Gaussian model (a parametric method) and the Gaussian mixture model (a semi-parametric method). We choose these two methods because of their simplicity and well-known, desirable mathematical tractability.

Gaussian Probability Model.

A Gaussian probability model was used to estimate the posteriori likelihood of a data observation given the assumption that an upright face was present in an image test window. In this model, starting with the standard Gaussian form $$P(x|\Omega) = \frac{\exp\left(-\frac{1}{2}(x-\mu)\Sigma^{-1}(x-\mu)\right)}{2\pi^{\frac{n}{2}}|\Sigma|^{\frac{1}{2}}} \quad (6)$$

(having $\Omega$ represent the class of faces, $\Sigma$ the full covariance matrix and $\mu$ the mean of the Gaussian) we substitute an approximation for equator (6) in which the principal components $y=\Phi^T(x-\mu)$ are combined with the reconstruction residual to arrive at a two-component estimate of likelihood $$\hat{P}(x|\Omega) = \left[\frac{\exp\left(-\frac{1}{2}\sum_{i=1}^{d}\frac{y_i^2}{\lambda_i}\right)}{2\pi^{\frac{d}{2}}\left(\prod_{i=1}^{d}\lambda_i\right)^{\frac{1}{2}}}\right]\left[\frac{\exp\left(-\frac{\varepsilon^2(x)}{2\rho}\right)}{(2\pi\rho)^{(N-d)/2}}\right] \quad (7)$$

where $\rho$ is an estimate of the average of the N–d least significant eigenvalues, $\Phi$ the matrix of most significant eigenvectors of $\Sigma$ in the columns, the $\lambda_i$ are the d more significant eigenvalues, and $\epsilon^2(x)$ the reconstruction residual of the test datum x. The estimate $\rho$ is conventionally made by fitting the eigenspectrum of $\Sigma$. These two components of the probability estimate $\hat{P}(x|\Omega)$ have conventionally been termed the "distance in face space" (DIFS) and "distance from face space" (DFFS) in this context. The advantage of this two-component formulation is that, by considering the reconstruction residual, the estimate explicitly takes into account the possibility of a different explanation for the observed data other than the presence of the desired object. It has been shown that such a formulation leads to improved density estimations in real-world applications to facial imaging.

Gaussian Mixture Model.

The mixture model has the form $$P(x|\Omega) = \sum_{j=1}^{M} p(x|j)P(j) \quad (8)$$

subject to the constraints $$\sum_{j=1}^{M} P(j) = 1 \quad (9)$$

$$0 \leq P(j) \leq 1$$

Each of the M components are themselves diagonal-covariance Gaussian models after $$P(x|j) = \frac{\exp\left(-\frac{1}{2}\sum_{i=1}^{d}\frac{y_i^2}{\lambda_i^j}\right)}{2\pi^{\frac{n}{2}}\left(\prod_{i=1}^{d}\lambda_i^j\right)^{\frac{1}{2}}} \quad (10)$$

with again $y = \Phi^T(x-\mu^j)$ being the reduced dimension representation of x. (Now, subscripts indicate vector components, superscripts identify the vectors associated to the different mixture components). Notice that the second residual term in equation (7) is dropped for the sake of analytical simplicity in the derivative of the parameter estimation algorithm explained later. Even with this simplification, direct training of such a model by density estimation becomes intractable, and resort must be made to an iterated estimate of the parameters of the Gaussian components p(x|j) and the prior component probabilities P(j). The expectation-maximization (EM) algorithm uses the analytical derivatives of the training data likelihood with respect to the model parameters (P(j), j=1 ... M, $\lambda_i^j$, i=1 ... d, and $\mu^j$) to iteratively improve estimates of the parameters in a gradient-descent framework.

Expectation-Maximization of a Gaussian Mixture Model

Starting from Bishop, C., *Neutral Networks for Pattern Recognition*, Oxford University Press, Oxford, 1995 the derivation of the expectation-maximization algorithm for estimating the parameters of the Gaussian mixture model $$P(x|\Omega) = \sum_{j=1}^{M} p(x|j)P(j) \quad (11)$$

using the diagonal-covariance components $$P(x|j) = \frac{\exp\left(-\frac{1}{2}\sum_{i=1}^{d}\frac{y_i^2}{\lambda_i^j}\right)}{2\pi^{\frac{n}{2}}\left(\prod_{i=1}^{d}\lambda_i^j\right)^{\frac{1}{2}}} \quad (12)$$

where of course $y = \Phi^T(x-\mu^j)$ is the low-dimension representation of x. EM uses the maximum-likelihood principle: parameters are chosen to maximize the joint likelihood of the observed training data. To this end, we minimize the negative log likelihood of the training data given by $$E \equiv -\sum_{n=1}^{N} \ln p(x^n) = -\sum_{n=1}^{N} \ln\left\{\sum_{j=1}^{M} p(x^n|j)P(j)\right\} \quad (13)$$

We can take analytical derivatives of equation (13) with respect to the model parameters to obtain the following expressions:

$$\frac{\partial E}{\partial \mu_i^j} = \sum_{n=1}^{N} P(j|x^n)\frac{\mu_i^j - y_i^n}{\lambda_i^j} \quad (14)$$

$$\frac{\partial E}{\partial \lambda_j^i} = \sum_{n=1}^{N} P(j|x^n)\left\{-\frac{1}{2\lambda_i^j} + \frac{(y_i^n - \mu_i^j)^2}{2(\lambda_i^j)^2}\right\} \quad (15)$$

Finding $$\frac{\partial E}{\partial P(j)}$$

while simultaneously enforcing the constraints equation (9) can be effected by introducing M auxiliary variables $\gamma_j$ and the softmax formulation $$P(j) \equiv \frac{\exp(\gamma_j)}{\sum_{k=1}^{M} \exp(\gamma_k)} \quad (16)$$

which ensures that the constraints are satisfied for any values of the $\gamma_j$. Then, $$\frac{\partial E}{\partial \gamma_j} = \sum_{n=1}^{N} \{P(j|x^n) - P(j)\} \quad (17)$$

and the P(j) can be computed using the definitions equation (16). To minimize equation (13), we set derivatives with respect to all adjustable parameters (equations 14, 15, 17) to zero, leading to the following update equations:

$$\hat{\mu}^j = \frac{\sum_{n=1}^{N} P(j \mid x^n) x^n}{\sum_{n=1}^{N} P(j \mid x^n)} \quad (18)$$

$$\lambda^j = \frac{\sum_{n=1}^{N} P(j \mid x^n) \|y^n - \hat{\mu}^j\|^2}{\sum_{n=1}^{N} P(j \mid x^n)} \quad (19)$$

$$\hat{P}(j) = \frac{1}{N} \sum_{n=1}^{N} P(j \mid x^n) \quad (20)$$

Equations (18-20) form a coupled set of non-linear equations, where the parameters on the left hand sides also appear on the right hand sides due to the presence of the posteriori class probabilities $P(j|x^n)$, and hence the equations cannot be solved directly. The EM must be provided with initial estimates for all parameters (P(j), j=1 . . . M, $\lambda_i^j$, i=1 . . . d, and $\mu^j$) and then it iteratively computes equations (18-20) for some desired number of updates, or until a local minimum is achieved. An iteration of the algorithm can never increase the log likelihood equation (13), and hence the algorithm is guaranteed to converge to at least a local minimum.

A face detector is used to find the locations in the derotated image of the window that have a high probability of containing faces. The output of this detector consists of estimated pixel locations for the eyes (for frontal faces) or eye and ear center for profile faces.

Face Detector

An example of a suitable face detector is provided in Schneiderman, H., and Kanade, T., "Probabilistic Modeling of Local Appearance and Spatial Relationships for Object Recognition", *Proc. CVPR* 1998, 45-51. This detector, called algorithm S, implements a Bayesian classifier that performs maximum a posteriori (MAP) classification using a stored probability distribution that approximates P(face|image). The method is called Bayesian because of the use of Bayes' theorem to convert the a priori measured training distribution P(image|face) into the posterior probability in the presence of evidence from an image. The evidence consists of the pixel values in a spatial- and intensity-normalized image window. The use of Bayes' theorem is mandated by the observation that image evidence can be ambiguous. In some cases, objects and scenes not in the class of interest (i.e. faces, in this context) can give rise to image patterns that can be confused with class (=face) objects. Bayes' theorem requires the collection of representative non-class images, known as "world" images. The collection of world images proves to be the most difficult and critical process involved with training the algorithm. The difficulty lies in the fact that the world is very diverse. Faces are not diverse (at least when compared to the world), and so collection of training examples of faces is quite straightforward. This difficulty will be discussed at length in the section on training.

Algorithm S is discussed in the context of face detection, but it will be understood that the same algorithm can alternatively be trained to detect cars, cakes, and other moderately-variable objects such as birthday and wedding cakes.

Algorithm S was subject to the following simplifications (described in the sections that follow):
1) standardize face region size
2) decompose face region into sub-regions
3) ignore dependencies between sub-regions
4) project sub-regions to lower dimension representation using PCA
5) code projections using sparse coefficients
6) quantize sparse coefficients
7) decompose appearance and position
8) ignore position for uncommon patterns
9) vector quantize positional dependence for common patterns
10) apply (1)-(9) at multiple resolutions, assuming independence between resolutions Standardize Object Region Size Spatially normalized faces can be presented in a 56×56 pixel region. This simplification changes P (face|image) into $$P(\text{face}|56 \times 56 \text{ region}) \quad (21)$$

Decompose Object Region into Sub-Regions

Each face region is decomposed into multiple overlapping 16×16 pixel sub-regions. These sub-regions can be anchored at every pixel position in the region, or at a subset of these positions, for example, sub-regions anchored at every third pixel in every third line. With this choice, there are 196 possible anchor positions of a sub-region within a face region; this position can therefore be encoded in a single byte. On the right hand side of equation (21), "region" can be replaced with "{sub-region}", an aggregate of sub-regions.

The sub-region size is chosen so that individual sub-regions, when suitably positioned, are large enough to contain facial features (such as eyes, nose, or mouth). This size limits the largest image feature that can be examined as a coherent unit.

Ignore Dependencies Between Sub-Regions

No attempt was made to model the statistical dependencies between sub-regions. This simplification therefore limits the type of object attributes that can be modeled. For example, while a single sub-region can contain sufficient pixels to capture an eye, the other eye will fall into a different sub-region, and there can be no consideration taken of similarity or dissimilarity between the two eyes. Nor can any reasoning be based on the relative levels of illumination of different parts of the face.

Using this simplification, equation (21) can now be replaced with $$\prod_{i=1}^{\#subregions} P(\text{face} \mid subregion_i) \quad (22)$$

where the statistical independence is reflected in the lack of joint dependencies on multiple sub-regions.

Project Sub-Regions to Lower Dimension Representation Using Principal Components Analysis (PCA)

Since sub-regions contain 256 pixels, with 256 gray levels each, the number of possible sub-regions is huge. The next simplification involves applying the standard technique of linear PCA to reduce the dimensionality of the sub-region from 256 to twelve. (The choice of twelve dimensions is somewhat arbitrary. Upwards of 90% of actual sub-region variance can be encoded using no more than twelve dimensions.) To perform the PCA, a large training set of face images was processed, with all sub-regions participating in the data analysis.

As to the question of whether separate principal components are necessitated for different image resolutions and multiple face poses it was decided that distinct sets of principal components would be stored for each resolution, but that it was not necessary to keep different sets by face pose.

The result of the projection step is that each image sub-region becomes represented by the twelve projection coefficients along the principal component axes. This representation amounts to representing each sub-region by a linear combination of twelve principal sub-regions. The projection operation is carried out by a matrix operation $$[proj] = A^T [subregion] \qquad (23)$$

where A is the projection matrix whose columns contain the eigenvectors (principal components) of the training sub-regions. Note that the PCA operates on a training set of face images only. False (non-face) examples are not used since the resulting principal components would likely be subject to wide variability caused by statistically inadequate sampling of the very large set of possible non-face images. As a result of this step, expression equation (22) leads to $$\prod_{i=1}^{\#subregions} P(\text{face} \mid proj_i) \qquad (24)$$

Code Projections Using Sparse Coefficients

Rather than retain all twelve projection coefficients, the sub-region representation is further compressed by retaining only the six most significant. However, this sparse coding scheme is further complicated by grouping the last six coefficients pair-wise into groups and considering their sum square values when selecting the six projection dimensions to retain. In this way, twelve coefficients are reduced to six for subsequent processing.

Quantize Sparse Coefficients

Further compression of sub-region representation occurs through discrete quantization of the nine coefficients using a Lloyd-Max quantizier. This quantizer minimizes the mean-square quantization error under the assumption of a Gaussian distribution of the independent variable. For common values of the number of quantization values, the bin breakpoints and the reconstruction levels of Lloyd-Max quantizers are tabulated in Lim, J., *Two-Dimensional Signal and Image Processing*, Prentice-Hall, New Jersey, 1990. To test the validity of the Gaussian distribution assumption, the actual distribution of the projection coefficients of the training set were collected. It was seen that the Gaussian assumption closely matched the actual distribution.

The choice of the number of sparse coefficients retained and the number of quantization levels allocated to each coefficient determines the number of possible quantization values that encode image sub-regions. Based on the choices of six prominent dimensions, with some (arbitrary choices) of 8, 4, or 2 quantization levels for each dimension, the algorithm as implemented can represent each sub-region by one of approximately 1,000,000 numbers. These quantized numbers are somewhat inscrutably called "q1" values in the reference. The number of possible q1 values is an algorithm sizing parameter referred to as "$n_q1$" in Schneiderman, H., and Kanade, T., "Probabilistic Modeling of Local Appearance and Spatial Relationships for Object Recognition", *Proc. CVPR* 1998, 45-51.

The compression advantage of this quantization scheme becomes clear when it is seen that $256^{256}$ possible sub-region patterns are encoded in $10^6$ distinct numbers.

Following the quantization step, the probability equation (24) is further simplified to $$\prod_{i=1}^{\#subregions} P(\text{face} \mid q1_i) \qquad (25)$$

Decompose Appearance and Position

At this point in the chain of simplifications of the probability distribution, equation (25) is expanded to explicitly include both the pixel pattern of a sub-region and its position within the face region. Equation (25) is replaced with $$\prod_{i=1}^{\#subregions} P(\text{face} \mid q1, pos_i) \qquad (26)$$

where each sub-region is now represented by its quantization value and its position within the face region. Interpretation of equation (26) intuitively leads to thoughts like the following: eye-like patterns ought to occur in face regions only in the sub-regions likely to contain eyes.

Ignore Position for Uncommon Patterns

Given that 1,000,000 quantization levels and 196 positions are possible for each sub-region, further simplifications of equation (26) must occur. Two more simplifications are made to this expression. First, a decision is taken to encode the positional dependence of only the most commonly occurring q1 patterns. To this end, a large sorting step orders the q1 patterns by decreasing frequency of occurrence in the training set. All q1 patterns that sort below an occurrence threshold will have their positional dependence replaced by a uniform positional distribution. The number of q1 patterns whose positional distribution is to be explicitly learned during training is an algorithm sizing parameter referred to as "$n_{est}$" in [SCHN98]. For the uncommon patterns, equation (26) becomes $$\prod_{i=1}^{\#subregions} \frac{P(\text{face} \mid q1_i)}{npos} \qquad (27)$$

where npos=196 is the number of possible sub-region positions.

Vector Quantize Positional Dependence for Common Patterns

The second simplification to equation (26) involves a further reduction in the number of positional distributions learned during training. Already, the simplification of the previous section has reduced the number of positional distributions to be learned from $n_{q1}$ to $n_{est}$. Now, a further reduction from $n_{est}$ to $n_{q2}$ will be performed by vector quantizing the $n_{est}$ surviving positional distribution into $n_{q2}$ representative distributions. For purposes of this quantization, the two dimensional positional distributions of the q1 patterns are rasterized into vectors. The number $n_{q2}$ is an algorithm sizing parameter.

The vector quantization training algorithm is not the standard LBG algorithm, but rather an ad hoc custom algorithm, performed on a single pass through the input vectors. This single-pass nature is important, since the training algorithm will likely be quantizing tens or hundreds of thousands of vectors, and therefore must show concern for speed. The training process is outlined as follows:

For each vector x
    Find the closet current pattern center
    Calculate the distance d between x and the closest center.
      The sum
      squared error (SSE) metric is used.
    If d<threshold
      Add x to cluster; update cluster center
    else
      Seed new cluster with x.

For this algorithm to function properly, it must of course handle empty clusters gracefully, and also deal with the imposition of a maximum number $n_{q2}$ of clusters. The cluster centers are computed as the average (ideally, weighted average by occurrence count) of the vectors that map to the cluster. The selection of the distance threshold is problematic and based essentially on empirical observation of the behavior of the quantization training when using different values of the threshold. The goal of this selection is to make full use of the available number of quantization levels while spreading out the distribution vectors as uniformly as possible.

Upon application of the vector quantization of positional distributions, the position pos in equation (26) is mapped to one of the VQ pattern centers, identified as pos'. Equation (26) then becomes, for more common patterns, $$\prod_{i=1}^{\#subregions} P(\text{face} \mid q1, pos'_i) \quad (28)$$

Apply Detection at Multiple Resolutions, Assuming Independence Between Resolutions Since the statistical dependencies between sub-regions cannot be captured in the simplified probability model that has been developed, features Since the statistical dependencies between sub-regions cannot be captured in the simplified probability model that has been developed, features larger than sub-regions cannot be considered. To overcome this limitation, multiple levels of image resolution are now introduced. The entire mechanism of the probability estimator in equation (21) will be applied to multiple levels of image resolution, leading to $$\prod_{j=1}^{nmags} \prod_{i=1}^{nsubs} P(\text{face} \mid q1_i^j) \quad (29)$$

At each resolution, the eyes must reside at standard positions.

Full Form of Simplified Probability Distribution

Gathering together equations (28) and (29), and applying Bayes' theorem to relate prior probabilities gathered during training to the posterior probabilities in these expressions leads to the full form of the estimated likelihood of face presence in an image region. Details of the complete derivation of this equation appear in Schneiderman, H., and Kanade, T., "Probabilistic Modeling of Local Appearance and Spatial Relationships for Object Recognition", *Proc. CVPR* 1998, 45-51.

$$P(\text{face} \mid \text{region}) = \prod_{j=1}^{nmags} \prod_{i=1}^{nsubs} P(q1_i^j \mid \text{face}) \frac{P(pos' \mid q1_i^j, \text{face}) P(\text{face})}{\frac{P(q1_i^j \mid \text{face})}{npos} P(\text{face}) + \frac{P(q1_i^j \mid \overline{\text{face}})}{npos} P(\overline{\text{face}})} \quad (30)$$

In this expression, P(face) and P($\overline{\text{face}}$) represent the prior probabilities that an image region either does or does not contain a face. In the absence of this knowledge, uniform priors equal to ½ are used, leading to a further simplification in equation (30).

Training and Applying the Detector

Representative face images were collected from varied sources. Each face exemplar was multiplied many times by applying small perturbations to the image to produce many more examples. The perturbations include translation, rotation, scaling, and flipping horizontally. Noise processes were not included in the perturbations because the face images came from a variety of sources with varying levels of image quality. Three different resolution versions of each face example are gathered. Expansion of the training set is necessary to reduce the sensitivity of the detector to small variations in imaging parameters (pose, translation, etc.) at testing time.

Bootstrap training was used for non-face training. In the bootstrap training methodology, the detector is first trained with a random collection of examples in the difficult class (which is non-faces, in this case). A poorly performing classifier will result. This classifier is applied to a number of test images and likely produces large numbers of false positives. These non-face examples are then fed back into the training set, and the algorithm is trained again. The whole process is then repeated for a number of training rounds.

Training Steps

The training divides naturally into two major phases. The goal of the first phase is to obtain specific parameters of the quantization of face sub-regions. The initial step is to capture the covariance matrix and then principal components of the sub-regions from the training set. As part of this step, following extraction of the principal components, another pass is made through all the training sub-regions to gather the statistics of their projections unto those twelve principal dimensions. The projection data are analyzed statistically. The second order statistics are fed back into the training program to enable optimal design of the Lloyd-Max quantizier. Since the variation of face patterns is quite large when considered across different scales of resolution, this process of extracting principal components and the statistical distribution of the training data along those components must be repeated for each image resolution.

The second phase of training starts by passing through the training set and performing the quantization of each sub-region of each face example. As mentioned above, the training set can be expanded by creating slightly perturbed versions of each training exemplar. The frequency with which quantized values appear is counted in a histogram having roughly 1,000,000 bins. Simultaneously, sub-region positions at which each quantized value occurs are accumulated. A sort operation arranges the quantization frequency histogram in decreasing order of occurrence count. For the next most frequency quantized patterns, the positional distributions enter into the vector quantization algorithm. Following vector quantization, only $n_{q2}$ seminal positional distributions are retained, and each of the nest frequent quantization values will have a positional distribution approximated by the retained distributions.

Applying the Object Detector

To use the trained face detection algorithm, the computation of equation (30) must be applied to an image region on which spatial and intensity normalization have been conducted. Three different resolution versions of each candidate face region are required. The quantization value for each sub-region is computed, and the various probability terms in equation (30) are extracted from the probability tables created during algorithm training.

To use equation (30) for face detection, a probability threshold must be selected. When the posterior probability exceeds the threshold, then face detection has occurred. After the algorithm training process has been completed, the threshold is determined using a verification set of about 600 face and non-face images.

To obtain reasonable test phase performance, some careful attention must be paid to data structures and data representation. In general, the probability histogram is quite sparse and can therefore be considerably compressed if speed of access is not degraded. Considering equation (30), it can be seen that two basic data structure accesses must be facilitated. First, given a q1 value, it must be determined whether the value is common or rare. If common, there must be a fast way to look up the probability of joint occurrence of that quantization value in a specified sub-region position.

Image Search

The prior discussion has generally shown how a single image window can be tested for the presence of the desired object in a manner insensitive to in-plane rotation of the object. The invention is not so limited. An object can be found regardless of its size and position in the image. Those skilled in the art of image understanding and pattern recognition will recognize that there are many standard schemes of image searching to accomplish these goals. Two prominent schema of image searching are attentive and non-attentive (i.e., "brute force").

Attentive schemes use salient image characteristics to focus detailed processing to regions of the image likely to contain interesting information. For example, in the case of faces, image color can be used to focus attention in regions that might contain faces. Solid blue or green regions can be excluded from consideration, since human skin cannot ordinarily take on such color values in a color image. Other attentive mechanisms in the literature include those based on biological vision, using simplified models of retinal processing such as center-surround receptive field neural models. The attraction of attentive methods lies in the speed improvements that occur when large portions of an image can be rejected quickly during image searching.

Non-attentive schemes for image search typically examine all possible image windows, at all positions and all scales, to perform an exhaustive search for the target object. Such schemes might be chosen for a number of reasons over the attentive alternatives. Most particularly, if the classification decision itself is very fast (as in the case of this invention), the brute force search can actually be faster than the attentive search.

It will be understood that different methods of image search—both attentive and non-attentive—can be used as part of this invention. A non-attentive search is currently preferred for two reasons. First, this approach avoids the use of color information and can thus be used with monochrome images. Second, due to the choice of image feature measurements and probability models in preferred implementations, the classification decisions are made so rapidly that they are computationally competitive with attentive methods in this case. Chosen window sizes range from 28×28 pixel windows to 224×224 pixel windows in a geometric series of sizes, with the ratio constant equal to $\sqrt[3]{\sqrt{2}}$.

A set of n=4936 facial images was used for training and testing of the algorithms described herein. Each image had resolution 56×56 pixels, with the eyes manually aligned in fixed locations. The images came from a variety of different sources. Some were cut from consumer photographs; some came from credit card pictures; others came from formally posed portraits. In general, algorithms were trained and tested using a five-fold cross validation strategy: four-fifths of the image set was used to train, while the other one-fifth was used to test; and the process was repeated five times, so that every individual image served as a test object at least once, and no training image doubled as a test image.

The Gaussian model-based rotation estimator was trained and tested with the five-fold cross validation strategy, with results shown in the following table.

TABLE 2

Results of five-fold cross validation of Gaussian model.

| Training set | $N_{test}$ | Angle = 0° | Angle = 10° | Angle = −10° | % within ±10° |
|---|---|---|---|---|---|
| 1 | 988 | 897 | 37 | 29 | 97.5 |
| 2 | 987 | 794 | 62 | 87 | 95.5 |
| 3 | 989 | 820 | 52 | 63 | 94.5 |
| 4 | 988 | 838 | 43 | 61 | 95.3 |
| 5 | 987 | 819 | 59 | 67 | 95.7 |
| Totals | 4939 | 4168 | 253 | 307 | 95.7 ± 1.1 |

Figure 10:
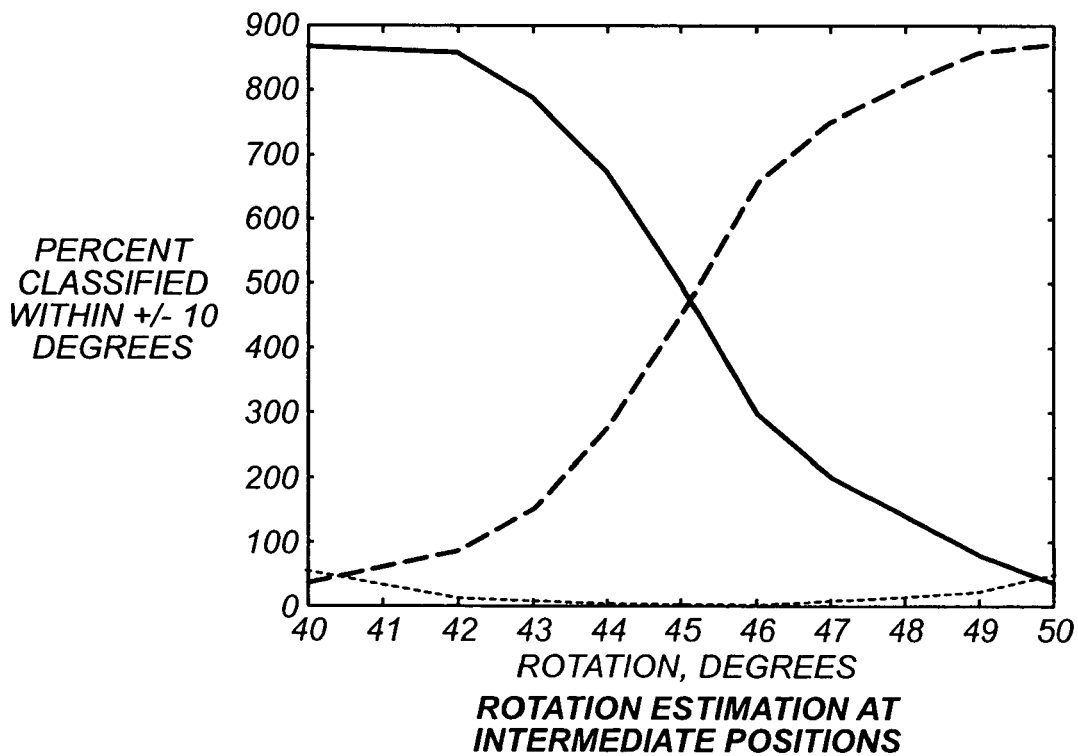
FIG. 10 is a diagram of tested intermediate rotation positions. The plots show the rotation estimation made by the Gaussian model as function of the actual rotation. Solid line—estimated 40° orientation; dashed line 50°; dotted lines 30° (left) and 60° (right).

In the next test, one of the five folds was used to test the rotation estimation algorithm, this time using rotated test images. That is, the test images were all rotated to the 36 angular positions, spaced every 10°, and their rotational orientation was estimated. A further test was run to examine the performance of the Gaussian model when the true image orientation falls between the 10 degree spaced test orientations. In FIG. 10, are plotted the percentages of test images categorized as having the neighboring discrete rotational positions, by 1 degree increments of position.

A Gaussian mixture model was trained with three components according to the following strategy. Three groups of faces, each containing 1218 faces, were used to initialize the Gaussian mixture components. The three groups were separated based on head pose, representing left-facing, frontal, and right-facing heads, respectively. Following training, the posteriori component probabilities P(j) in (3) were 0.24, 0.50, and 0.26 respectively. The following table shows the results of the five-fold cross validation experiment, specifically counting rotation estimates within ±10° of upright (all training and test images were nominally considered upright with respect to in-plane rotation).

TABLE 3

Results of five-fold cross validation of Gaussian mixture model.

| Training set | $N_{test}$ | Angle = 0° | Angle = 10° | Angle = -10° | % within ±10° |
|---|---|---|---|---|---|
| 1 | 988 | 815 | 62 | 68 | 95.6 |
| 2 | 987 | 822 | 43 | 74 | 95.1 |
| 3 | 987 | 804 | 57 | 75 | 94.8 |
| 4 | 987 | 805 | 68 | 69 | 95.4 |
| 5 | 987 | 788 | 64 | 87 | 95.1 |
| Totals | 4936 | 4034 | 294 | 373 | 95.2 ± 0.3 |

In the next test, one of the five folds was used to test the rotation estimation algorithm, this time using rotated test images. That is, the test images were all rotated to the 36 angular positions, spaced every 10°, and their rotational orientation was estimated. The results are consistent across all 36 angular positions, ranging from 95.6% to 96.6% correct within ±10°, with standard deviation of 0.2%.

Figure 11:
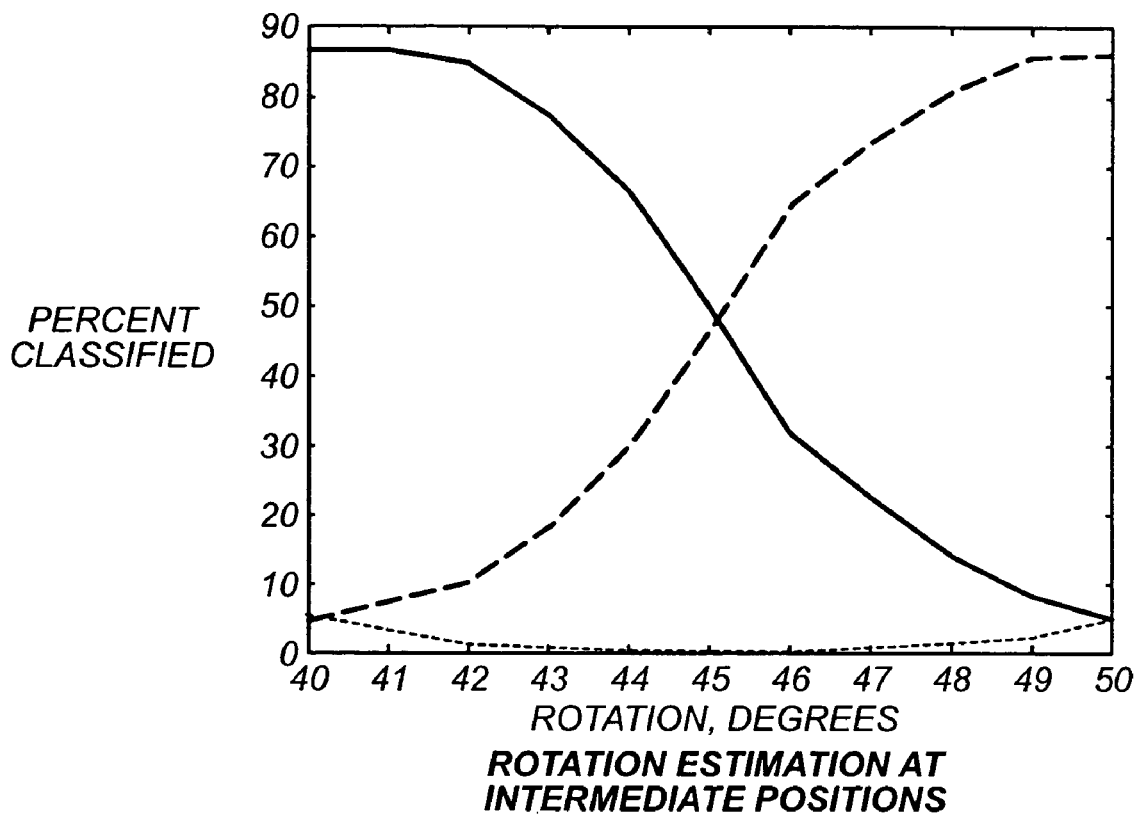
FIG. 11 is another diagram of tested intermediate rotation positions. The plots show the rotation estimation made by the Gaussian mixture model as function of the actual rotation. Solid line—estimated 40 degrees orientation; dashed line 50 degrees; dotted lines 30 degrees (left) and 60 degrees (right) degrees.

A further test was run to examine the performance of the mixture model when the true image orientation falls between the 10 degree spaced test orientations. In FIG. 11 are plotted the percentages of test images categorized as having the neighboring discrete rotational positions, by 1 degree increments of position.

To generate the data in FIGS. 10-11, the test faces (n=988) where rotated in one degree increments and tested against fixed positions at 10 degree increments. Responses were smoothly varying despite the fact that the actual faces fell between the discrete test positions.

The invention has been described in detail with particular reference to certain preferred embodiments thereof, but it will be understood that variations and modifications can be effected within the spirit and scope of the invention.

What is claimed is:

1. A method for locating a regularly configured object within a digital image, said method comprising the steps of:
   computing a plurality of primary rotated integral images of said digital image, each said primary rotated integral image having a different in-plane rotation;
   deriving from each of said primary rotated integral images a set of secondary rotated integral images having further in-plane rotations relative to the respective said primary rotated integral image;
   defining a window within said digital image and corresponding windows of said rotated integral images;
   extracting the values of convolution sums of a predetermined set of feature boxes within said window, in each of said rotated integral images;
   reducing dimensionality of said convolution sums to provide a set of reduced sums;
   applying a probability model to said reduced sums to provide a best estimated derotated image of said window.

2. The method of claim 1 wherein said further in-plane rotations are at 90 degrees, 180 degrees, and 270 degrees relative to the respective said primary rotated integral image.

3. The method of claim 1 further comprising, following said applying, detecting the regularly configured object within said derotated image.

4. A method for locating one or more regularly configured objects within a digital image, said method comprising the steps of:
   computing a plurality of rotated integral images of said digital image, each said rotated integral image having a different in-plane rotation;
   defining a plurality of windows within said digital image and corresponding pluralities of windows of said rotated integral images;
   extracting the values of convolution sums of a predetermined set of feature boxes within each said window, in each of said rotated integral images;
   reducing dimensionality of said convolution sums from each of said windows, to provide a respective set of reduced sums;
   applying a probability model to each of said sets of reduced sums to provide a best estimated derotated subimage of each of said windows.

5. The method of claim 4 wherein said further in-plane rotations are at 90 degrees, 180 degrees, and 270 degrees relative to the respective said primary rotated integral image.

6. The method of claim 4 applying a detection algorithm to each of said derotated subimages.

7. The method of claim 4 wherein said reducing further comprises applying a principle components analysis to said convolution sums.

8. The method of claim 4 wherein said probability model is selected from the group consisting of Gaussian and modified Gaussian probability models.

9. The method of claim 8 wherein said probability model has the form:

$$\hat{P}(x \mid \Omega) = \left[ \frac{\exp\left(-\frac{1}{2}\sum_{i=1}^{d} \frac{y_i^2}{\lambda_i}\right)}{2\pi^{\frac{d}{2}} \left(\prod_{i=1}^{d} \lambda_i\right)^{\frac{1}{2}}} \right] \left[ \frac{\exp\left(-\frac{\varepsilon^2(x)}{2\rho}\right)}{(2\pi\rho)^{(N-d)/2}} \right]$$

10. The method of claim 8 wherein said probability model has the form:

$$P(x \mid j) = \frac{\exp\left(-\frac{1}{2}\sum_{i=1}^{d} \frac{y_i^2}{\lambda_i^j}\right)}{2\pi^{\frac{d}{2}} \left(\prod_{i=1}^{d} \lambda_i^j\right)^{\frac{1}{2}}}$$

11. The method of claim 4 wherein said defining further comprises exhaustively searching said rotated digital images at all locations and scales.

12. The method of claim 4 wherein said feature boxes are arranged in first and second horizontal rows, each row having two outer feature boxes, each said outer feature box being longer horizontally than vertically, each said row having a single inner feature box disposed between respective said outer feature boxes.

13. A computer program product for locating a regularly configured object within a digital image, the computer program product comprising computer readable storage medium having a computer program stored thereon for performing the steps of:
   computing a plurality of rotated integral images of said digital image, each said rotated integral image having a different in-plane rotation;
   defining a plurality of windows within said digital image and corresponding pluralities of windows of said rotated integral images;
   extracting the values of convolution sums of a predetermined set of feature boxes within each said window, in each of said rotated integral images;
   reducing dimensionality of said convolution sums from each of said windows, to provide a respective set of reduced sums;
   applying a probability model to each of said sets of reduced sums to provide a best estimated derotated subimage of each of said windows.

14. A system, which locates a regularly configured object within a digital image, said system comprising:
   a computational unit receiving a digital image from an image source, said computational unit including:
      an integral image module computing one or more primary rotated integral images of said digital image, each primary rotated integral image having a different rotation relative to an initial position defined by the in-plane rotational position of the digital image;
      a derivation module deriving a set of secondary rotated integral images from each of the primary rotated integral images;
      a window module defining one or more windows within the primary integral images and corresponding windows in said secondary rotated integral images;
      an image measurement module extracting one or more sets of representative image measurements from each of said windows and summarizes said measurements as one or more corresponding numerical data vectors;
      a dimensionality reduction module performing a mathematical transformation on the numerical data vectors, resulting in transformed numerical data vectors that have an increased stability;
      a probability module evaluating a probability density model, using said transformed numerical data vectors, to determine a probability of a face being present.

15. The system of claim 14 further comprising a derotation module digitally rotating a extracted image window produced by said probability model by an amount to exactly compensate for the most probable face orientation, producing a derotated image.

16. The system of claim 14 further comprising an object identification module detecting the regularly configured object within said derotated image.

17. The system of claim 14 wherein said regularly configured object is a member of the class of human faces.

18. The system of claim 14 wherein said window module exhaustively searches said rotated digital images at all locations and scales.

19. The system of claim 14 wherein said image measurement module extracts values of convolution sums of a predetermined set of feature boxes within each said window, in each of said rotated integral images.

* * * * *